UNITED STATES PATENT OFFICE.

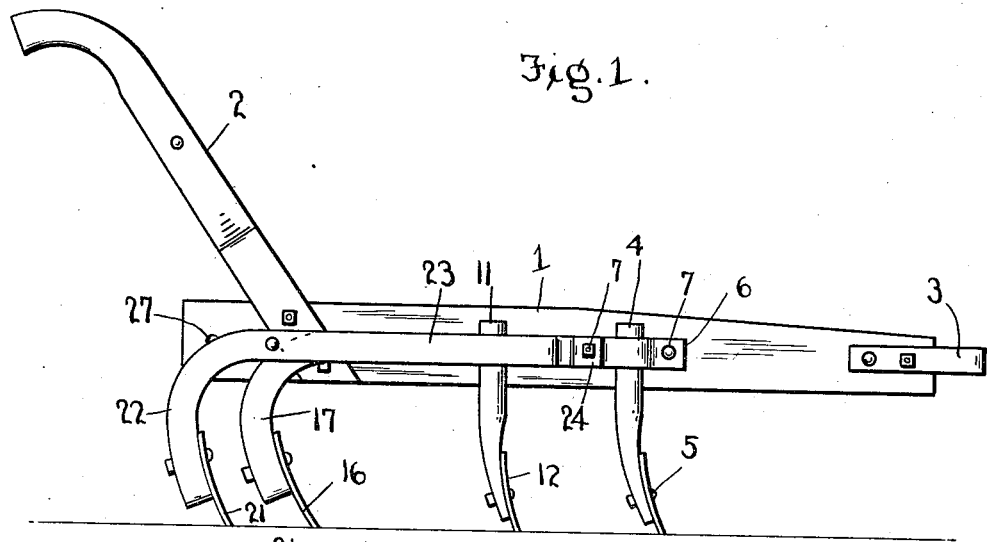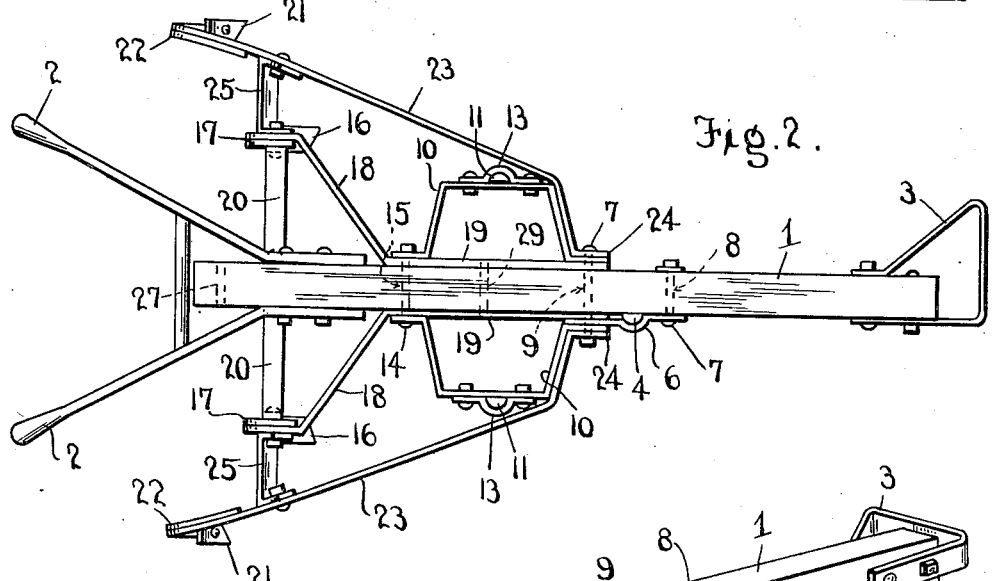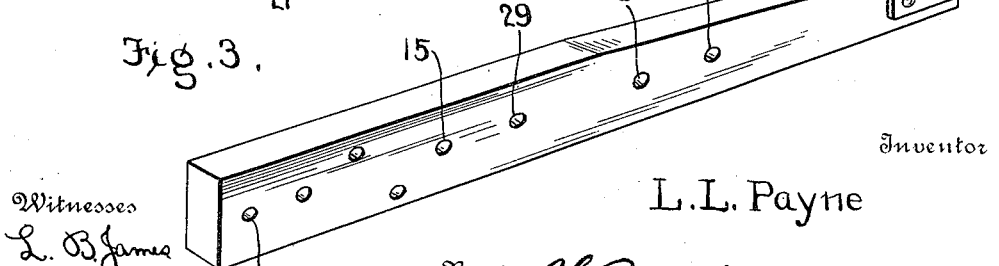

LAWRENCE LAFAYETTE PAYNE, OF GREER, SOUTH CAROLINA.

CULTIVATOR.

1,087,395.   Specification of Letters Patent.   Patented Feb. 17, 1914.

Application filed September 16, 1912.   Serial No. 720,620.

*To all whom it may concern:*

Be it known that I, LAWRENCE LAFAYETTE PAYNE, a citizen of the United States, residing at Greer, in the county of Greenville and State of South Carolina, have invented certain new and useful Improvements in Cultivators; and I do declare the following to be a full, clear, and exact description of the invention, such as will enable others skilled in the art to which it appertains to make and use the same.

This invention relates to improvements in cultivators.

One object of the invention is to provide a cultivator having an improved construction and arrangement of main beam and an improved arrangement of teeth or shovels which are detachably connected to the main beam, whereby they may be readily shifted to various positions on the main beam to form different styles of cultivators or ground working implements.

Another object is to provide a cultivator of this character which will be simple, strong and durable in construction, efficient and reliable in operation and well adapted to the purpose for which it is designed.

With these and other objects in view, the invention consists of certain novel features of construction, combination and arrangement of parts as will be more fully described and claimed.

In the accompanying drawings, Figure 1 is a side view of my improved cultivator showing all of the teeth or shovels arranged in their proper relative positions; Fig. 2 is a top plan view thereof; Fig. 3 is a detail perspective view of the main beam of the cultivator with the teeth or shovels removed therefrom.

Referring more particularly to the drawings, 1 denotes the main centrally disposed beam of my improved cultivator, said beam having attached thereto near its rear end suitable handles 2 and to its forward end a clevis 3. In the beam 1 are a series of transverse or horizontally disposed bolt holes which are properly arranged or spaced apart to receive the fastening bolts for the supporting and attaching members of the teeth or shovels of the cultivator as will be hereinafter more fully described.

Secured to one side of the beam is a front tooth or shovel supporting standard 4 having on its lower end a cultivating tooth or shovel 5 which may be of any desired construction. The standard 4 is firmly clamped into engagement with the side of the beam 1 by a clip 6 with the apertured ends of which are engaged clamping bolts 7, said bolts being engaged with bolt holes 8 and 9 formed in the beam 1 as shown. Secured to the opposite sides of the beam 1 immediately in rear of the front shovel standard 4 are substantially U-shaped shovel supporting frames 10 to the outer longitudinal sides of which are secured the upper ends of a second set of shovel or tooth supporting standards 11 to the lower ends of which are secured shovels or teeth 12. The standards 11 are secured to the frames 10 by clips 13 which are bolted or otherwise secured to the outer side bars of the frames as shown. The frames 10 are secured at their forward ends to the beam 1 by the inner bolt 7 which fastens the inner end of the clip 6, and at their rear ends said frames are secured by a bolt 14 which is engaged with a bolt hole 15 in the beam as shown.

Arranged in rear of and spaced a suitable distance from the shovels 12 is a third set of shovels or teeth 16 which may be of any suitable construction and which are adjustably secured to the lower ends of standards 17. The standards 17 are preferably formed on or integral with the rear ends of oblique draft bars 18 having their forward ends 19 extending alongside the beam 1 and provided with bolt holes to receive the inner fastening bolt 7 of the clip 6 and the fastening bolt 14 of the shovel supporting frames 10. The length of the draft bars is such that the standards hold the shovels or teeth 16 slightly out of longitudinal alinement with the second set of shovels 12. The upper ends of the standards 17 and outer ends of the bars 18 are further secured to the beam 1 and firmly braced by laterally projecting brace bars 20 which are secured at their inner ends to the beam and at their outer ends to the upper ends of the standards 17 as shown.

Arranged in rear of and spaced laterally a suitable distance from the shovels 16 is a fourth set of teeth or shovels 21 which may be of any suitable construction and which are adjustably secured to the lower ends of supporting standards 22, preferably formed integral with the rear ends of forwardly projecting converging draft bars 23. The front ends of the bars 23 are bent inwardly toward the opposite sides of the beam 1 and thence carried forwardly to form attaching lugs 24 having bolt holes with which is engaged the inner attaching bolt 7 of the front clip 6. The bars 23 are suitably braced and connected at their rear ends to the standards 17 of the third set of shovels 16 by brace bars 25 which are secured to the standards 17 and bars 23 by bolts or other suitable fastenings as shown.

By constructing and arranging the shovel supporting and attaching members of the cultivator as herein shown and described, it will be seen that said members together with their respective standards and shovels may be detached from the beam 1 and rearranged to provide a variety or number of different styles of cultivators or ground working implements some of which are illustrated in the last figures of the drawings and will now be described. As shown the forward portions of the converging draft bars 23 conform to and closely embrace the front sides of the U-shaped supporting and bracing frames 10, said draft bars converging outwardly and secured at their opposite ends to the short brace bars 25 as previously described whereby the draft bars are projected from the plow beam at the proper angle and the entire structure strengthened and properly braced.

In the plan view of the device shown in Fig. 2 of the drawings the teeth or shovels are all arranged in proper relative position for forming a general purpose cultivator. When it is desired to transform the device into a small double foot cultivator it is simply necessary to remove or disengage all of the shovels and their attaching and supporting devices from the beam 1 and to shift the frames 10 of the second set of shovels 12 back on the beam in such position that the forward ends of said frames may be secured to the beam by the bolt 14 which originally fastened the rear end of the frames and to fasten said rear ends by a bolt 26 which is engaged therewith and with a bolt hole 27 formed in the beam near its rear end. When it is desired to transform the device into a large double foot cultivator all of the shovels and their attaching devices are removed except the third set of shovels 16 which are permitted to remain in their original positions on the beam. In order to transform the cultivator into a side harrow the shovels and their attaching devices are all removed from the beam and the frame 10 of the shovel 12 on one side of the beam is shifted inwardly to a position wherein the forward end of said frame may be fastened by the front bolt 7 which formerly engaged the bolt hole 8 and fastened the clip 6 of the front shovel, and in which position the rear end of said frame 10 is fastened by a bolt 28 which is engaged with a bolt hole 29 formed in the beam a short distance in rear of the hole 9 with which the rear fastening bolt of the clip 6 was originally engaged. The frame 10 of the tooth 12 on the opposite side of the beam is shifted rearwardly until the forward end of said frame is in position to be engaged by the bolt 14 in the bolt hole 15 of the beam which formerly secured the rear end of said frame 10, said rear end of the frame now being fastened by the bolt 26 which fastened the rear end of said frame with the beam when the frame was arranged to form the small double foot cultivator, or, in other words, the frame 10 on this side of the beam is in exactly the same position as it occupied in forming the small double foot cultivator. After the frames 10 have been thus arranged on opposite sides of the beam the standard 4 and front shovel 5 are shifted to a position on one side of the beam between said frames 10 and the clip 6 which originally held the standard 4 is again engaged with said standard and fastened in operative position by the bolt 28 which engages the bolt hole 29 and the bolt 14 which engages the bolt hole 15 and fastens the adjacent inner ends of the frames 10 to the beam. By constructing and arranging the shovels and their supporting and attaching devices as herein shown and described, it will be seen that these parts may be readily shifted and secured to the main beam to provide various styles of cultivators or ground working implements some of which have been shown and described and others of which may be formed by changing the plows to different positions. It will also be noted that the various styles of cultivators shown and referred to are formed without providing any additional or different parts but by simply rearranging and omitting certain of the plows and their attaching devices.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The herein described cultivator comprising a main beam having a draft appliance at its front end and handles at its rear end, U-shaped supporting and bracing frames secured to the opposite sides of said beam, sectional brace bars projecting from the opposite sides of the beam near the rear end thereof, oblique draft bars having their inner ends secured to the beam and their outer ends to the sectional brace bars, a clip secured to one side of the beam and located adjacent to the supporting frame on that side of the beam, converging draft bars having their inner ends secured over the flanged portions of the U-shaped supporting frames and extending outwardly and conforming to and in contact with the front side of said frames, the remaining portions of said draft bars extending outwardly and secured to the outer ends of the sectional brace bars, whereby the entire structure is straightened and properly braced and shaped, and land working implements adjustably and detachably secured to said structure.

In testimony whereof I have hereunto set my hand in presence of two subscribing witnesses.

LAWRENCE LAFAYETTE PAYNE.

Witnesses:
J. T. GREEN,
J. R. PATRICK.